Patented Nov. 4, 1941

2,261,169

UNITED STATES PATENT OFFICE 2,261,169

CARBAMIC ACID ESTERS

William A. Lott, Westfield, N. J., assignor to E. R. Squibb & Sons, New York, N. Y., a corporation of New York No Drawing. Application January 26, 1940, Serial No. 315,755

10 Claims. (Cl. 260—482)

This invention relates to, and has for its object the provision of: alicyclic-alkyl esters of carbamic acids, having the general formula:

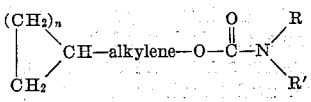

—especially those having the general formula:

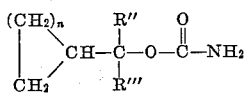

—wherein R, R', R'', and R''' represent each hydrogen or alkyl (preferably lower alkyl), and $n$ represents a whole number between 1 and 4 inclusive; and a method of preparing these esters. The compounds of this invention are valuable therapeutic agents, being useful as hypnotics and rectal anesthetics.

The term "alkylene" is used in the specification and claims in its most comprehensive sense, i. e. as embracing branched-chain alkylene, methylene, and alkyl-substituted methylenes.

The compounds of this invention are conveniently prepared by reacting an alicyclic-alkanol with phosgene, and reacting the resulting alicyclic-alkyl ester of chloro-formic acid with a compound of the general formula

wherein R and R' have the above-given signification.

The following examples are illustrative of the invention.

EXAMPLE 1

Cyclopropyl-methyl carbamate 10 g. cyclopropyl-carbinol is dissolved in 30 cc. anhydrous benzene, the solution is cooled to 10° C., and a solution of 13.8 g. phosgene in 25 cc. benzene is added thereto dropwise, while stirring. The temperature rises, and then falls, indicating completion of the reaction. Then 16.8 g. dimethyl-aniline in 60 cc. benzene is added at 10–20° C., with stirring, which is thereafter continued for one-half hour, the mixture is washed with ice-water, and dried over sodium sulfate. The benzene solution is then agitated with 15 cc. of a 28% ammonium hydroxide solution at 15–20° C., and the mixture maintained at 6° C. for fifteen hours, then washed successively with water, dilute hydrochloric acid solution, dilute sodium carbonate solution, and finally water, and then dried over sodium sulfate. On concentrating the benzene solution and adding petroleum ether, the cyclopropyl-methyl carbamate is obtained as white needle-like crystals, melting at 80° C.

EXAMPLE 2

Cyclobutyl-methyl carbamate 10.0 g. cyclobutyl-carbinol is dissolved in 3 cc. benzene, the solution is cooled to 10° C., and 26 cc. of a 44% benzene solution of phosgene is added thereto dropwise, while stirring. On completion of the reaction, 12.2 g. dimethyl-aniline in 50 cc. benzene is added at 10–20° C., while stirring, the mixture is stirred for one-half hour, washed with ice water, and dried over sodium sulfate. The benzene solution is then agitated with 15 cc. of a 28% ammonium hydroxide solution at 15–20° C., and the mixture maintained at 6° C. for fifteen hours, then washed and dried as described in Example 1. On concentrating the benzene solution and adding petroleum ether, the cyclobutyl-methyl carbamate is obtained as white needle-like crystals, melting at 60° C.

EXAMPLE 3

α-cyclopropyl-propyl carbamate 10.0 g. α-cyclopropyl-propanol is dissolved in 30 cc. benzene, the solution is cooled to 10° C., and 23 cc. of a 44% benzene solution of phosgene is added thereto dropwise, while stirring. On completion of the reaction, 12.1 g. dimethyl-aniline in 62 cc. benzene is added at 10–20° C., while stirring, the mixture is stirred for one-half hour, washed with ice water, and dried over sodium sulfate. The benzene solution is then agitated with 15 cc. of a 28% ammonium hydroxide solution, and the mixture maintained at 6° C. for fifteen hours, then washed and dried as described in Example 1. The benzene is removed by distilling in vacuo, and the crude product crystallized from dilute ethanol. The α-cyclopropyl-propyl carbamate is obtained as white needle-like crystals, melting at 95–96° C.

Manifestly, a variety of other alicyclic-alkyl esters of carbamic acids may be obtained by using the corresponding reactants in the method described hereinabove; thus, one may use other alicyclic-alkanol reactants, inter alia cyclopentyl-alkanols, cyclohexyl-alkanols, alicyclic-ethanols, alicyclic-isopropanols, and alicyclic-butanols, or other

reactants, inter alia, methylamine, ethylamine, and dimethylamine.

The invention may be variously otherwise embodied, within the scope of the appended claims.

I claim:

1. An alicyclic-alkyl ester of a carbamic acid, having the general formula

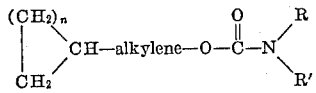

wherein R and R' represent each a member of the group consisting of hydrogen and lower alkyl, and $n$ represents a whole number between 1 and 4 inclusive.

2. An alicyclic-alkyl ester of a carbamic acid, having the general formula

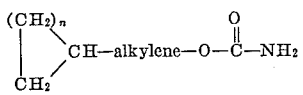

wherein $n$ represents a whole number between 1 and 4 inclusive.

3. An alicyclic-alkyl ester of a carbamic acid, having the general formula

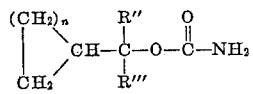

wherein R'' and R''' represent each a member of the group consisting of hydrogen and alkyl, and $n$ represents a whole number between 1 and 4 inclusive.

4. Cyclopropyl-methyl carbamate.
5. Cyclobutyl-methyl carbamate.
6. α-cyclopropyl-propyl carbamate.
7. The method of preparing an alicyclic-alkyl ester of a carbamic acid which comprises reacting an alicyclic-alkanol with phosgene, and reacting the resulting alicyclic-alkyl ester of chloro-formic acid with a compound of the general formula

wherein R and R' represent each a member of the group consisting of hydrogen and lower alkyl.

8. The method of preparing an alicyclic-alkyl ester of a carbamic acid which comprises reacting an alicyclic-alkanol with phosgene, and reacting the resulting alicyclic-alkyl ester of chloro-formic acid with ammonia.

9. The method of preparing an alicyclic-alkyl ester of a carbamic acid which comprises reacting phosgene with an alicyclic alkanol of the general formula

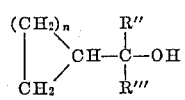

wherein R'' and R''' represent each a member of the group consisting of hydrogen and alkyl, and $n$ represents a whole number between 1 and 4 inclusive, and reacting the resulting alicyclic-alkyl ester of chloro-formic acid with a compound of the general formula

wherein R and R' represent each a member of the group consisting of hydrogen and lower alkyl.

10. A cyclobutyl-alkyl ester of a carbamic acid, having the general formula

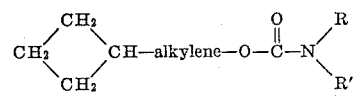

wherein R and R' represent each a member of the group consisting of hydrogen and lower alkyl.

WILLIAM A. LOTT.